(12) United States Patent
Nair et al.

(10) Patent No.: US 12,081,617 B2
(45) Date of Patent: Sep. 3, 2024

(54) NETWORKED SYSTEM FOR REAL-TIME COMPUTER-AIDED AUGMENTATION OF LIVE INPUT VIDEO STREAM

(71) Applicant: Avesha, Inc., Bedford, MA (US)

(72) Inventors: Raj Nair, Lexington, MA (US); Prabhudev Navali, Westford, MA (US); Sudhir Halbhavi, Bangalore (IN); Chin-Cheng Wu, Carlisle, MA (US)

(73) Assignee: Avesha, Inc., Chelmsford, MA (US)

( * ) Notice: Subject to any disclaimer, the term of this patent is extended or adjusted under 35 U.S.C. 154(b) by 0 days.

(21) Appl. No.: 17/394,102

(22) Filed: Aug. 4, 2021

(65) Prior Publication Data

US 2022/0046292 A1 Feb. 10, 2022

Related U.S. Application Data

(60) Provisional application No. 63/183,244, filed on May 3, 2021, provisional application No. 63/061,364, filed on Aug. 5, 2020.

(51) Int. Cl.
*H04L 67/1001* (2022.01)
*G06N 20/00* (2019.01)
(Continued)

(52) U.S. Cl.
CPC ......... *H04L 67/1001* (2022.05); *G06N 20/00* (2019.01); *H04L 41/0816* (2013.01);
(Continued)

(58) Field of Classification Search
CPC ..... H04L 67/1001; H04L 67/60; G06N 20/00; H04N 21/2187; H04N 21/42203;
(Continued)

(56) References Cited

U.S. PATENT DOCUMENTS

| 9,959,644 | B2 | 5/2018 | Monney et al. |
| 10,169,535 | B2 | 1/2019 | Mentis |

(Continued)

FOREIGN PATENT DOCUMENTS

| EP | 3582137 A1 | 12/2019 |
| WO | 20180217635 A1 | 11/2018 |

(Continued)

OTHER PUBLICATIONS

Peng Liu, et al.; "EDGEEYE—An Edge Service Framework for Real-Time Intelligent Video Analytice," Proceedings of the 1st International Workshop on Edge Systems, Analytics and Networking, Jun. 10, 2018, pp. 1-6.

(Continued)

*Primary Examiner* — Sumaiya A Chowdhury
(74) *Attorney, Agent, or Firm* — BainwoodHuang

(57) ABSTRACT

A networked system for real-time computer-aided augmentation of a live input video stream includes an endpoint system configured and operative to handle the live input video stream and a live augmented video stream and to provide service access to a video augmentation service for the computer-aided augmentation of the live input video stream. The system further includes a backend system providing service orchestration to orchestrate use and operation of the video augmentation service, and an edge inference system coupled to the endpoint system and to the backend system, the edge inference system being configured and co-operative with the endpoint system to provide the video augmentation service on the live input video stream and thereby generate the live augmented video stream, based on the service orchestration by the backend system.

20 Claims, 4 Drawing Sheets

(51) Int. Cl.
*H04L 41/0816* (2022.01)
*H04L 47/20* (2022.01)
*H04L 67/02* (2022.01)
*H04L 67/60* (2022.01)
*H04N 21/2187* (2011.01)
*H04N 21/422* (2011.01)
*H04N 21/431* (2011.01)
*H04N 21/433* (2011.01)
*H04N 21/466* (2011.01)
*H04N 21/472* (2011.01)

(52) U.S. Cl.
CPC ............ *H04L 47/20* (2013.01); *H04L 67/02* (2013.01); *H04L 67/60* (2022.05); *H04N 21/2187* (2013.01); *H04N 21/42203* (2013.01); *H04N 21/4312* (2013.01); *H04N 21/4334* (2013.01); *H04N 21/466* (2013.01); *H04N 21/47217* (2013.01)

(58) Field of Classification Search
CPC ........... H04N 21/4312; H04N 21/4334; H04N 21/466; H04N 21/47217
See application file for complete search history.

(56) References Cited

U.S. PATENT DOCUMENTS

| | | |
|---|---|---|
| 10,430,662 B2 | 10/2019 | Katz et al. |
| 2020/0026954 A1 | 1/2020 | Rhodes et al. |
| 2020/0327371 A1* | 10/2020 | Sharma ................... H04L 67/34 |
| 2020/0394012 A1 | 12/2020 | Wright, Jr. et al. |
| 2021/0406737 A1* | 12/2021 | Zingaretti ............... G06N 20/00 |

FOREIGN PATENT DOCUMENTS

| | | | | |
|---|---|---|---|---|
| WO | WO-2019207170 A1 * | 10/2019 | ............. | A61B 34/10 |
| WO | WO-2020076321 A1 * | 4/2020 | ........... | G06F 16/532 |

OTHER PUBLICATIONS

Christian Geiger, et al.; "Mobile AR4ALL." Augmented Reality, 2001. Proceedings IEEE and ACM International Sympo Sium on New York, NY, USA, Oct. 29-30, 2001, Los Alamitos, CA, USA, IEEE Comput. Soc, US, Oct. 29, 2001, pp. 181-182.

Marco Trinelli, et al.; "Transparent AR Processing Acceleration at the Edge," Edge Systems, Analytics and Networking ACM, 2 Penn Plaza, Suite 701 New York, NY, 10121-0701 USS, Mar. 25, 2019, pp. 30-35.

* cited by examiner

NETWORKED SYSTEM FOR REAL-TIME COMPUTER-AIDED AUGMENTATION OF LIVE INPUT VIDEO STREAM

CROSS REFERENCE TO RELATED APPLICATIONS

This application is a regular utility application based on earlier-filed U.S. Application No. 63/061,364 filed on Aug. 5, 2020, entitled "Real Time Edge Inference Platform", the contents and teachings of which are hereby incorporated by reference in their entirety.

Additionally, this application claims priority to and the benefit of earlier-filed U.S. Application No. 63/183,244 filed on May 3, 2021, entitled "Smart Application Framework", the contents and teachings of which are hereby incorporated by reference in their entirety.

BACKGROUND

This application is related to the field of computer-aided video augmentation, and to the field of networked services.

SUMMARY

A networked system for real-time computer-aided augmentation of a live input video stream includes an endpoint system configured and operative to handle the live input video stream and a live augmented video stream and to provide service access to a video augmentation service for the computer-aided augmentation of the live input video stream. The system further includes a backend system providing service orchestration to orchestrate use and operation of the video augmentation service, and an edge inference system coupled to the endpoint system and to the backend system, the edge inference system being configured and co-operative with the endpoint system to provide the video augmentation service on the live input video stream and thereby generate the live augmented video stream, based on the service orchestration by the backend system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
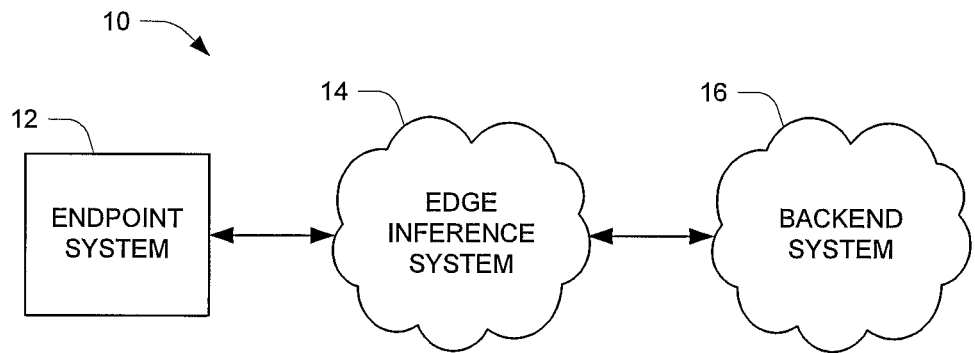
FIG. 1 is a block diagram of a networked system for real-time computer-aided augmentation of live input video stream.

FIG. 1 is a simplified block diagram of a networked system 10 for real-time computer-aided augmentation of a live input video stream. It includes an endpoint system 12, an edge inference system 14, and a backend system 16, each being a networked computer-based subsystem with structure and functionality as described more herein. Only one endpoint system 12 is shown and described for clarity only; in general, the system 10 is meant to support a potentially large number of endpoint systems (e.g., hundreds) with corresponding scaling of other system resources. The networked system 10 is also referred to as a "platform" herein, and in particular as an AI-assist platform (AAP) or ML-based platform because of its ability to host an inference engine, where AI refers to artificial intelligence and ML to machine-learning.

In some use cases, the AI-Assist Platform (AAP) 10 may provide the following:
  AI-Assistance to traditional workflows in healthcare vertical
    Examples include colonoscopy, EUS, ERCP, Urology, etc.
  AI-Assistance to other verticals such as:
    Automation, Gaming, Industrial Plants, Warehouses, Construction, Inspection, Retail, Education, Security, Surveillance, etc.
  AAP structure:
    Backend Cloud Platform native components (Backend 16) that are deployed over public cloud, hybrid-cloud or on-premises cloud
    Edge Inference Platform components (Edge 14) that are deployed over public edge cloud, edge data center, customer premises data center, co-located data centers, multi-access edge computing (MEC), edge compute networks. In one particular example, a low-latency "5G" network (public or private) serves as the edge network. The relatively low latency (e.g., less than 20 mSec) of such networks provides for desired real-time operation.
    Customer Premises Platform components (Endpoint 12) that are deployed in procedure rooms, hospital rooms, office building, industrial floors, etc.
  The following are major functional features of the system 10:
    1. AI/ML object-detection inferencing for Live video workflows, with live video augmentation based on results from AI/ML model on individual frames from the video.
    2. Edge inference platform, edge networks and data centers, edge cloud based workflows
    3. Voice/VUX natural language processing (NLP) based workflows for real-time voice-transcription annotation of procedures, such as colonoscopy in medical applications.
    4. Workflow automation, robot process automation (RPA) for automatically inserting a transcribed voice annotation to a correct position in the video stream using a menu-driven application
    5. AI/ML inferencing for image, streaming-data, data workflows
    6. Live Join—Joining a live stream from an external endpoint and view the video (before or after augmentation) in real-time. Also, able to annotate remotely that are shown in real-time in the monitor
    7. Continuous Learning—Continuously retraining the model based on the results of the inferencing that are sent back to the cloud for labeling, curation and inclusion into the training data set. This allows the model to continuously improve.
  Edge Inference System 14—Overview
    Generally, the edge inference system/platform is realized as a collection of services (microservices), with components providing AI/ML inference services for various video/image/data based workflows, including for example:
  Inference services for real-time streaming video based workflows
  Inference services for image based workflows
    Send one or more images to the platform to obtain inference metadata
  Inference services for streaming data, data based workflows
  Inference results, metadata for the inference requests
  Support for AI-Assist workflow related features:
    Features: Alerts, detections, NLP events, NLP intents, UI/UX events, notifications
    Platform provides APIs to support for the above features
  Support for AI/ML inference related features:
    Streaming video/media/images/frames support for inference
    Image/streaming-data/data support for inference
    APIs and protocols for inference requests
  The platform deploys Worker Nodes to perform the inferencing for the workflows
Edge Inference System 14—Core Service Features (Session Server, Inference Server)
  The following are core service features of the edge inference system 14:
  Live session support
  End-to-End Live Session support
  Low-latency support for Live Session
  VPN support
  Data and Network Security
  Multi-tenancy support
  Inference networks
  Multi-model inference
  Dynamic orchestration of resources for Live Session
    Worker Node, inference server(s) and Session Server(s)
    GPU pooling, GPU sharing
    Edge node selection using intelligent recommendation engine
  Dynamic orchestration using Nomad
  Dynamic orchestration using Kubernetes
  Scaling support
    Worker Nodes to scale large number of Live Sessions
  Nomad Clients, k8S minions for Worker Node
    GPU, memory, CPU resource allocation per client/worker-node
  Multiple models on single GPU sharing resources
  Multiple models across multiple GPUs sharing resources
  Configuration support, Consul client, manifest driven, device registration
  Key and Certs management for the Edge Platform node
Edge Inference System 14—Inference Workflow Types
  Session based workflows for streaming video or streaming data
    Streaming video protocols, SRT, UDP, TCP, MPEG-TS, HLS, CMAF, DASH, RTP, RTSP and other streaming protocols
    Streaming data protocols/frameworks
    Dynamic session orchestration
    Session is served by one or more Worker Nodes, composed of:
      One or more Inference Servers
      One of more Session Servers
    Sessions can be of any duration (seconds to hours)
  Inference service for image/data requests
    HTTP/HTTPS based requests
    GRPC, RPC, UDP/TCP based data stream
  Streaming Media Input
    1. Streaming Media
      a. Streaming video protocols, SRT, UDP, TCP, MPEG-TS, HLS, CMAF, DASH, RTP, RTSP and other streaming protocols
      b. Series of images (JPEGs, MJPEG, PNG, etc. formats)
      c. Series of video frames, video formats, codecs MJPEG stream, MP4, AVC/HEVC video frames, key-frames, etc.
    2. Image
      a. One or more images (JPEGs, MJPEG, PNG, etc. formats)
Use Cases
  Real-time augmentation of live video with object detection and classification
  Healthcare
    Colonoscopy, EUS, ERCP, Ureteroscopy, Pulmonary, Biliary
  Auto Vehicles
    Video for tele operations
  Industrial Inspection
  Manufacturing quality
    Circuit board inspection, etc.
  Robot Vision
  Retail
  Safety
    Object detection for safety violations
  Image Enhancements
  Electrical Signal
    Healthcare
    Cardiology
Live Session—Workflow Overview
  Live Session in AI-Assistance platform is an end to end workflow where AI/ML and natural language processing (NLP) is used to assist the operator/user/device to during a procedure.
  During Live Session of a procedure streaming media video/images/frames are sent from the feed node to Worker Node (on Edge Platform) for inferencing. The Inferencing results for object detection, image enhancement, etc. are then used by the Client UI/application for visual/audio notification to the Operator/User.
  The ML/AI models assist in object identification (and other assists) during the procedure.
  Live session also includes voice NLP based workflows to assist and collect metadata during procedure.
  Live session collects procedure metadata/images/voice NLP intents/objects of interest and other data. This data is used to generate reports, billing, offline analysis, metrics etc.
Live Session—Workflow Main Features
  Live Session Setup and Teardown
  Live-mode Playback
    MJPEG Stream
    Object Detection Alerts
      Confidence score, etc. metadata
    Live Annotations
      Intent based (NLP driven)
      Voice and text enabled
    NLP driven Intent based Annotations
      Voice enabled
    Feedback POP UPs
  Images, session data, Metadata stored in S3 and DynamoDB
Live Session—Workflow Modes A live session may operate in one of two workflow modes, namely a remote-live mode and a local-live mode.

In remote-live mode the live inference video (images/frames) are served from the Session Server (Edge) from the Edge Inference Platform. Inferencing is done at the Edge Platform; bounding boxes on objects of interest (inference results/metadata) are applied to images/frames at the Edge Node or sent to Client UI/application along with the frames/images.

In local-live mode the live inference video (images/frames) are served from the Session Server (Local) from CPE Client/Feed Node, which could be in a procedure room on CPE (or factory floor, etc. on CPE) for example. Inferencing is done at the Edge Platform; inference results/metadata is sent from Edge Node to Session Server (Local); Session Server local applies bounding box and other metadata on objects of interest to the video frames/images before serving them to UI/application.

Figure 2:
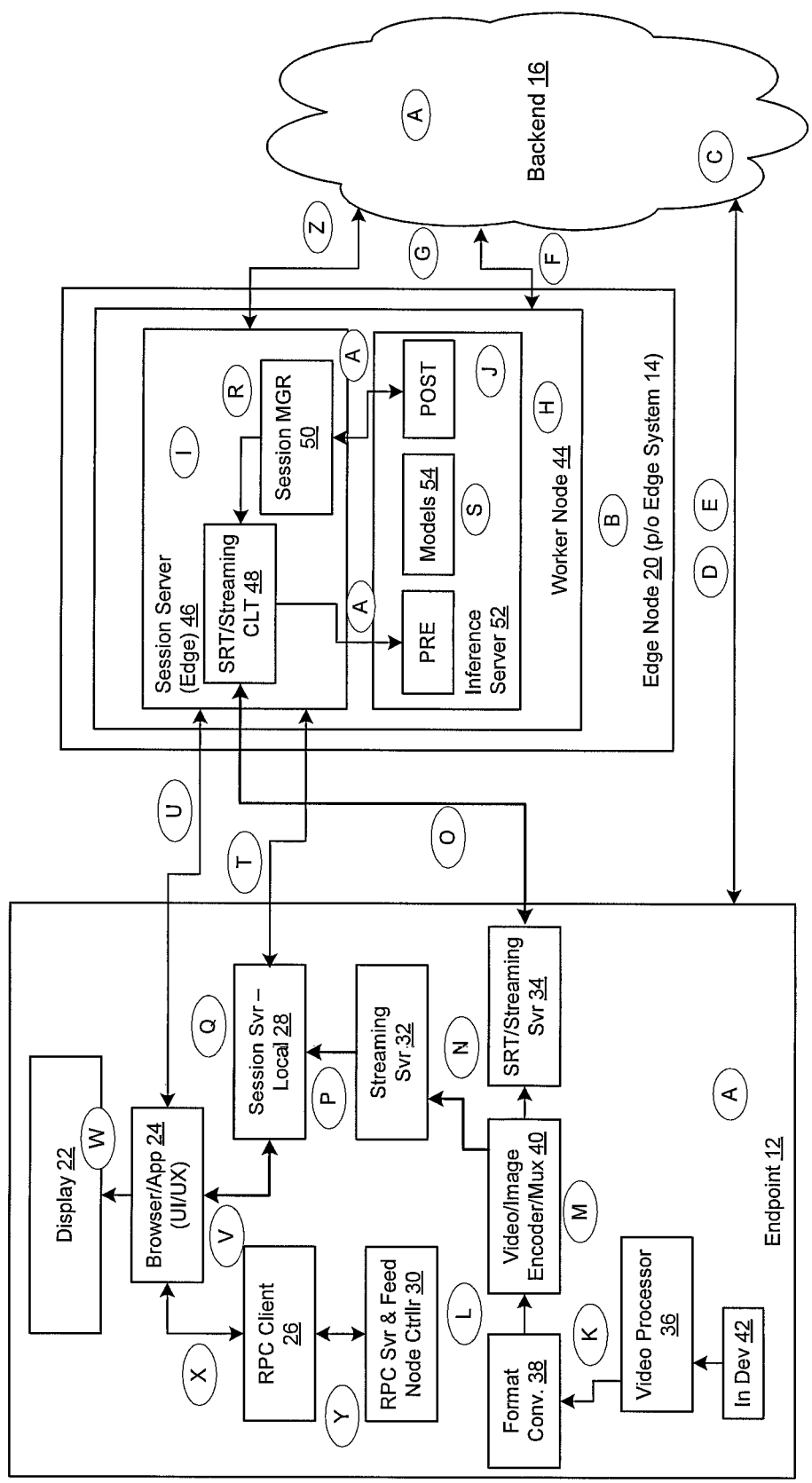
FIG. 2 is a more detailed block diagram of system components with annotations for process/operations.

FIG. 2 illustrates additional structure of the endpoint system 12 and an edge node 20 which resides in the edge inference system 14. FIG. 2 is also used to describe workflows (processes) of a live session, using encircled numbers to indicate corresponding steps described below.

Live Session—Workflow (FIG. 2)

A. The endpoint 12 (CPE/Procedure room) devices may be organized into separate Client and Feed nodes, or a combined Client and Feed Node). Devices include: display 22, browser/application 24, remote procedure call (RPC) client 26, local session server 28, RPC server and feed node controller 30, streaming server 32, SRT/streaming server 34, video processor 36, format converter 38, video/image encoder/multiplexer 40. The video source is an input device 42 such as an endoscope in the example medical application.

B. Edge Inference Platform 14 includes one or more Edge Nodes 20 connected to CPE devices via access networks (like fiber, 5G, internet, fixed wireless, LAN, WAN, Ethernet). Edge Nodes 20 support one or more Worker Nodes 44 that are used during the Live Session. The Edge Nodes 20 have GPUs/CPUs/memory resources and are part of the Inference Network. A worker node 44 includes an edge session server 46 which includes an SRT/streaming client 48 and session manager 50, and an inference server 52 which includes models 54, pre-inferencing components PRE and post-inferencing components POST.

C. The Backend 16 is a collection of cloud services including services and APIs to setup, teardown and manage the Live Sessions. This includes authentication, IAM, tokens, security, user, operator, patient, device data, schedules, procedure data, metadata, statistics, dashboards, DB, storage, HIPAA compliant workflows/services, ML workflows, like training pipeline, dataset pipeline. The Backend provides APIs to Edge Platform nodes, CPE client/feed node components, external billing systems, procedure management software/systems.

D. Backend 16 also provides APIs to CPE devices Client+Feed node components (Browser/application/UI/UX 24, Session Server Local 28, etc.) for session management, operator management, user/patient management, schedule management, NLP/voice training management, etc.

E. Operator/User starts the Live session, live inference session for the procedure video; UI application starts the session using Backend APIs; Session start request has procedure type and other user/patient/operator/policy parameters required for the session; Backend responds to UI with the session details; Session details include the allocation of the job, edge Worker Node and resources that are needed for the Live Session.

F. Backend scheduler selects the appropriate Worker Node 44 to perform the Live Session, and sends requests to dynamically orchestrate the Worker Node 44 on Edge Platform 14. Scheduler can be Nomad base scheduler or Kubernetes cluster based scheduler or a custom scheduler; Edge Node Worker Nodes 44 can be Nomad clients or Kubernetes PODs; Edge Node scheduler client starts the Worker Node 44 and its associated dockers and other applications/services to perform the Live Session.

G. Backend cloud services provides APIs for Edge Platform Worker Nodes 44 to send/receive the session status, session metadata, session related authentication/authorization data, session related keys/secrets/tokens from the Backend 16. Worker Node 44 components (session server 46 and inference server 52) use these APIs to send session metadata/video/images to backend storage services. Backend 16 provides storage, DB, dashboard, metrics, statistics, logs, keys, identity management, authentication, device registration, resource allocation, schedules, etc. related APIs to Worker Node components.

H. Worker Node 44 in Edge Node 20 provides the inference services to various workflows. In the local-live session, a Worker Node 44 provides inference services to the live procedure video/image based streaming media input. Worker Node 44 is composed of one or more Session Server (edge) dockers/applications 46 and one or more Inference Server dockers/applications 52.

I. Session Server (edge) 46 in a Worker Node 44 is responsible providing APIs and interfaces for the live inference session to Client and Feed nodes or Client+Feed Node of endpoint 12. Session Server (edge) APIs are used by the Session Server (Local) 28 on Client/Feed Node, UI/Browser/application 24, and other Client/Feed node components. Session Server 46 includes real time video/images streaming protocol support. Session Server (edge) 46 receives the images/frames from the Feed node; Session Server (edge) passes these video frames/images to Inference Server for inferencing.

J. Inference Server 52 provides ML model inferencing results for object detection/classification/image enhancement/etc. ML functions done for video frames/images sent to the server. Inference server receives these video frames/images from the Session Server (edge) 46 and returns the results back to Session Server (edge). Inference server can perform for inferencing for different types of objectives; inferencing can be for object detection in the video frame/images. Inferencing can be for image enhancement and/or object identification in the image/videoframe; object detection can be to detect one or more objects that are relevant for the procedure. For example in the colonoscopy procedure Live Session the objects of interests can be polyps, tools, colon features like Cecum, Appendiceal orifice, crow feet, Ileum, and colon parts like ascending colon, rectum, sigmoid colon, etc. The Inference Server 52 may have one or more models 54 running in parallel (or serial) to work on the video frames/images of procedure data. The Inference Server multi-model inferencing technique is used to send the image to every model at the same time. Inference server 52 may have one or more pre-inferencing components PRE; one or more inferencing models 54; one or more post-inferencing components POST. The pre-inferencing component PRE receives images/video frames from Session Server 46 and applies filters and sends them to all the models 54. The Models 54 perform inference ML function and apply various filters to the results. Inference results include scores, bounding box coordinates, object-ids, thresholds, object class and category and other metadata. Post-inferencing component POST collects inference results from all the models 54 and ensembles the results and passes the results to Session Server (edge) 46. Post-inferencing component POST can apply various filters to the inference results.

Object detection is a technique to detect and localize objects in images by using a neural network, whereas object classification predicts only the presence or absence of objects in an image. Object detection may be a preferred way to present information to the end user for more accurate and efficient workflow in a real time system, because it is as important to accurately locate the object as it is to classify it for quick observation. In addition, the challenges of real-time detection may require that detection in a live video be defined based on object persistence or permanence, i.e., the number of seconds it is in the field of view of the scope/camera.

For colonoscopy use case the system can take advantage of the temporal relationship of images that exists across consecutive frames. Due to the linear progression of the camera inside the GI tract, objects such as polyps are persistent in the field of vision for more than a few seconds. This persistence nature of the detected polyp across frames is used to progressively accumulate confidence score to more accurately classify and predict the presence of the polyp, its position and class. The temporal correlations of successive frames is also used in our system to enhance the detection accuracy by using the output of object tracking algorithms.

K. CPE Procedure room video processor device 36 (For example—for Colonoscopy procedure—Endoscope video processor) sends video frames/images (e.g., of real-time Colonoscopy video) via output interfaces. Video processor 36 can output in SD/HD SDI format, HDMI format or DVI format. The feed can be from video processor 36 or any other device that is used for the procedure or workflow for the Live Session. The feed can be live source or a local file playback from another device. The feed can be from one or more devices combined.

L. The live input video stream from video processor 36 or similar device is transcoded or transformatted to different video codec/format by video transcoder device 38, which converts SDI feed to MJPEG feed. The device 38 can also be used to convert other feed formats to MJPEG or other formats; The output of this device is sent to Feed Node. This device 38 can be part of the Feed node as well. Feed node components can perform this same transcoding function as well. The output format parameters can be controlled by the Feed node and can be different for different sessions or procedures/workflows. The MJPEG output can be of frame rates 0-120 fps (or any framerates supported by the devices), resolutions SD/HD/4K/8K or any support video/image resolution.

M. Video/Image format encoder/muxer device 40 is used generate video streams that are suited for video/image inferencing. This device can be part of the Video processor or video/image transcoder. The muxer 40 generates one or more video streams; the streams can be different formats MJPEG, MPEG-TS, MP4, etc. and can be carried over UDP/TCP/IP protocols. The device can generate one or more SD/HD/4K/8K/other-resolution format streams. These streams are sent to real-time streaming server component to send the stream to one or more Edge Nodes or to a local client or feed node.

N. Streaming Server component 32 is responsible for sending the video/image stream to one or more Edge Nodes 20 (Worker Nodes 44) for inferencing. In addition, Streaming Server 32 is responsible for sending the stream to a local client node. The local client can be a different device connected over the network in the same CPE or can be co-located on the same device as Feed Node (in Client+Feed Node case). The streaming Server supports many streaming protocols—like SRT, UDP, TCP, HTTP, QUIC, HLS, DASH, RTP/RTSP, Web-RTC etc. The streaming server supports encrypted transfer of the video stream. The encryption key/secrets can be per session. The streaming server provides low-latency transfer of the streaming media (video frames/images) to the Edge Nodes 20/Worker Nodes 44 on Edge Inference Platform 14. The streaming server 32 may send the data over various access networks—WAN/LAN, WIFI, 3G/4G, 5G, cable and IP networks.

O. Streaming Server 32 sends the streaming media video frames/images (MJPEG, MPEG-TS, UDP) to the Session Server's Streaming Client (SRT Client, etc.) 48, which Client supports one or more streaming protocols including low-latency streaming protocols. Streaming Client 48 sends the video frames/images to Inference Server 52; Inference Server 52 performs the model inferencing (object detection, image enhancement/object detection) functions.

P. The video stream frames/images from the Feed Node streaming server 32 are sent to Session Server (local) 28 which can be in Client or Feed Node or on Client+Feed Node for it to handle the frames; In the local-live mode the Session Server (Local) 28 is present and handles the video stream from Feed Node and processes it to be served to UI/browser application 24 to display it on local display 22. This is different than in remote-live mode—where UI/browser 24 gets the video stream from the Edge Node Session Server (edge) 46 to display on the local monitor/display device 22.

Q. Session Server (Local) 28 is an instance of Session Server that provides APIs to UI/Browser/application 24 in local-live Live Session mode. In this mode the UI/Browser/application 24 receives the video images/frames from the local Session Server 28. The Session Server (local) 29 gets the video frames from the local feed node and inference results from the Session Server (edge) 46 from the Worker Node 44 of the Edge Node 20 of Edge Inference Platform 14. The Session Server Local 28 communicates with Session Server edge 46 to get inference related metadata. The Session Server (local) 28 is client of Session Server (edge) 46. The Session Server (local) 28 can be act as proxy server for the Session Server (edge) requests from the UI/application. The Session Server (local) 28 combines the inference results received from the edge Worker Node 44 (Session Server (edge) 46 and inference server 52) and video frames received from the local streaming server/client/feed-node 32. The local Session Server 28 applies the inference metadata on to the video frames/images; the inference metadata can be bounding box coordinates, object-ids, object class/category, etc. The Session Server (local) 28 draws the bounding box for the objects detected on the video frames/images. In addition, additional policy based filters can be applied at the Session Server (local) 28. The Session Server (local) 28 can be part of client or feed node. UI/application in Live Session local-live mode—can get the live video frames with inference results applied to them from the local Session Server and get rest of the session alerts/intents/events/notifications/images/metadata/data from Session Server (edge) 46 from Worker Node 44 in the Edge Node 20. The UI/application can mix and match the APIs from both local and edge Session Servers. In addition, there may be more than one local Session Server running at the same time.

R. Session Server (edge) 46 is part of the Worker Node 44 in Edge Node 20. Session Server (edge) 46 provides APIs to manage the Live Session, live video inference results, live video images/frames with bounding box and other inference results on the images/frames that can be consumed by the UI/application from Client node(s) 12. Client node 12 communicates with Session Server 46 to get alerts/events/notifications/NLP intents/voice commands/annotations/detection ranges/etc. data/metadata from Session Server. In the remote-live mode the Session Server 46 can serve the live video frame/images with inference results applied (bounding box/score/object-id/class/category/etc.). For Live Session in remote-live mode Session Server (edge) 46 is used to serve the live video frames (after inference) with inference results applied to them. Client node(s) UI/application uses Session Server (edge) APIs to playback the live video. There can be additional Client(s) that can join the live video playback session using Session Server APIs. In the local-live mode Session Server (edge) sends the inference results (inference metadata) to Session Server (local) for it to apply the results to the video frames/images and serve the video image/frames to Client UI/application. Session Server (edge) communicates with the Inference Server to get the inference results and metadata related to video frames/images. The Session Server (edge) also includes the streaming server which receives the video frames/images and sends them to Inference Server. Frames can be selectively skipped if there are network/model latency issues. In some cases inferencing is skipped and object tracking is done to maintain visual continuity on the screen.

S. Video frames for the Live Session are sent to Inference Server by the Streaming Client in Session Server that receives the video frames/images from the Streaming Server in Feed Node. The Inference Server pre-inferencing component pre-processes the video frames/images and applies filters. The images/frames are then sent to models for to perform object detection inferencing. Models are trained with datasets annotated/labeled for object detection. The training pipeline is used to train the models for different classes/objects for the procedure/workflow. For a given workflow there can be many objects of interests and there can be many classes/categories for the same object. There can be one or more model for each class/category. The training produces frozen graphs and are used to during model object detection inference. The video frames/images are sent to one or more models at the same time (or in a staggered time) to get the inference results. Each model performs object detection inference and if there are any detections (one or more detections) the results—score/class/category/object-id/etc.—are sent to post-inferencing component. Post-inferencing component evaluates the results from all the models (ensemble the results) and applies any filters/policies configured and sends the inference metadata to Session Server (edge).

T. In the Live Session local-live mode, Session Server (edge) sends the inference results/metadata for a frame/image to Session Server (local) on Client/Feed Node. Session Server (local) applies these results on the video frames/images that it receives from local feed node. The Session Server (local) serves these video frames (with bounding box for objects identified) to client UI/application.

U. UI/application uses Session Server (edge) APIs to manage the Live Session with the Worker Node 44. It uses the APIs to playback live inference video (video images/frames with bounding box and other inference results applied for the objects identified) from the Edge Node. It uses these APIs to get/save/update alerts/events/notifications/annotations/NLP intent/voice commands/data/metadata related to session. In the Live Session remote-live mode, UI/application gets live playback video inference stream from the Session Server (edge) 46.

V. UI/application uses the APIs provided by the local Session Server 28 in the local-live mode. In this mode, Client UI/application 24 gets the live playback video inference stream (frames/images) from local Session Server 28. UI/application 24 can also use the Session Server (local) APIs to get other session related data/metadata.

W. UI/application uses HDMI/DVI/VGA/etc. interfaces to connect the client Node to Display/Monitor 22 to display the UI/application/UX components and live augmented video stream. The UI/UX includes alerts/notifications/event/detections/etc.

X. UI/application uses GRPC/RPC/Web-RTC API to communicate with components on Feed Node. This API provides methods to get/set feed node status, session status, feed status, start/stop session, get feed node details, etc.

Y. GRPC/RPC/Web-RTC server on Feed Node receives the messages from the Client node and sends responses back to Client. The messages are related to feed status, feed node status, session status, session start/stop, feed node details and other feed node components related data.

Z. Session Server (edge) sends session-related video/frames/images/metadata/logs/metrics etc. to data backend cloud storage for offline review and other functions. Session Server (edge) uses Backend services APIs to send status, metadata, session metrics to update the session data in Backend DB.

Other Modes—Live Review, Live Join, Offline

Beyond the live session functionality described above, the system 10 may support additional modes including Live Review, Live Join, and Offline.

In Live Review mode, the system provides playback controls such as fast forward, rewind, pause, etc., enabling a user to navigate the stream for review purposes. Additionally, the user may be able review, add and revise annotations, including voice/NLP based annotations and control. A user can tag an object such as by drawing a box and label the object.

Live Join enables one or more separate users to join an ongoing live session from another device, and may include features similar to Live Review as noted above (playback controls, annotation, etc.). For example, a number of students may join to observe the live procedure, or an expert physician/surgeon/operator joins to provide live feedback/consultation. The system can scale to large number of live join sessions.

Offline Review enables a user to review a previously recorded session, and may include review and editing of annotations, object ID and reporting, etc. Offline review can be used by the user/operator/physician to annotate recorded images that can be used for retraining the models.

NLP Intents

The Client UI/VUX workflows also support voice-activated functions referred to as "NLP Intents". The NLP intents are used for workflow automation.

For the colonoscopy use case, examples include scope in/out, take-a-picture <location, label>, cecum-reached, polyp detection, retroflexion, biopsy, etc. The UI/VUX workflows NLP intents are used by the physician/nurse/operator during the procedure to collect the metadata related to the procedure. The workflow automation RPA application transfers the NLP intents collected metadata from the back-end system into Physician/Operator procedure documentation application using robot process automation workflows to generate the procedure reports.

Multi-Model Inference Architecture

Figure 3:
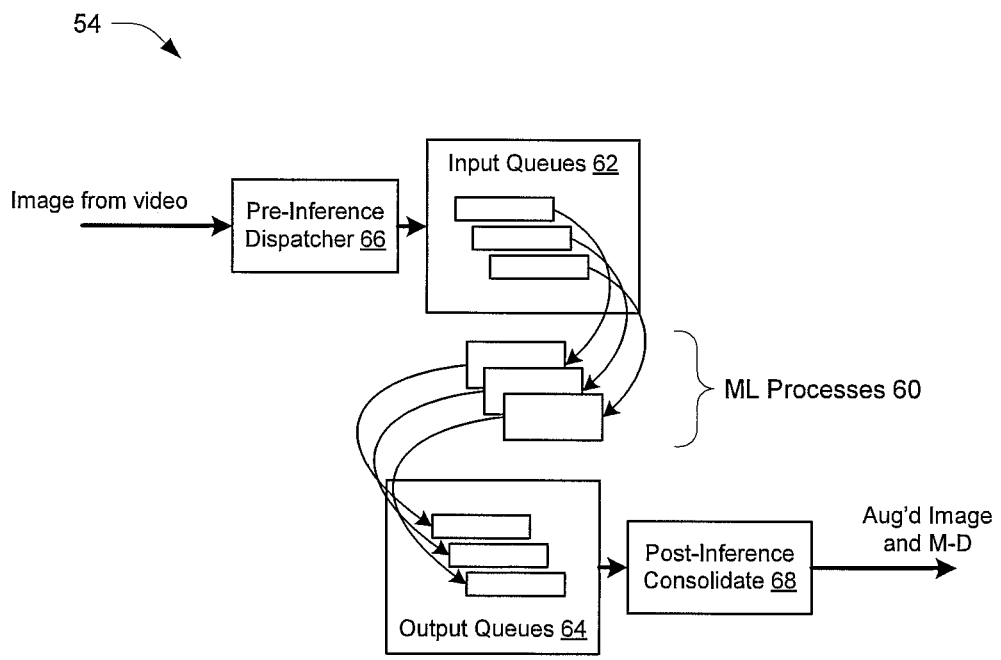
FIG. 3 is a schematic diagram of a model subsystem using multiple models and surrounding structure.

FIG. 3 illustrates details of the models 54. Due to training data being unbalanced, certain classes of objects may be over-represented in the input data sets. This can cause an object detection model to overfit to the class with the largest number of samples during training, such that the model may fail to detect classes that are not well represented in the data sets. To overcome this problem, multiple models are used along with partitioning of the data to have balanced classes.

To support multiple models, a set of ML processes 60 are used, one for each model. The model processes 60 share CPU and GPU resources on an edge node. Within each process a computation session (e.g., TensorFlow) and a graph provided by the job scheduler is created on the GPU. As shown, a set of input queues 62 is used at the input and a set of output queues 64 at the output of the models are created. Additionally, a pre-inference dispatcher 66 and post-inference consolidator 68 are used.

The pre-inference dispatcher 66 receives frames from the session server 46 (FIG. 2) and puts each frame on the appropriate input queue 62 corresponding to each model. It also updates the current frame number.

Each ML process 60 pulls the latest image frame from the respective input queue 62. This could be done by peeking into the queue or dequeuing the images until there are no more images in the queue and using the latest image. The model/graph 60 then performs inferencing on the input image. If an object is detected in the image, a data object is created with the following information:
    Frame number: Integer
    Class ID: Integer
    Box coordinates: Array of xmin, xmax, ymin, ymax
    Confidence score: float The post-inference consolidator 68 retrieves the metadata from each of the output queues 64 (FIG. 2). With the help of the metadata, the post-inference module 58 knows which image to process. In particular, it performs ensembling or weighting on the outputs to pick the best class. The module creates a single metadata data object corresponding to this image and send the metadata and the augmented image to the edge session server 46. The contents of the metadata can include:
    Frame number
    Class ID
    Box coordinates
    Confidence score A job scheduler is used to provide list of graphs, list of label map files and list of GPU IDs to use for each of the processes running the models.

Object Detection

During inference, upon performing object detection on an image, the output is the following:
    Number of detections
    For each detection:
        Class/Label
        Box coordinates
        Confidence Score This is used by the model to draw bounding boxes on the image after selecting the entries based on filtering box size and score thresholds. This data is then sent to session server 46 as a data object. The session server 46 tracks each of these boxes as separate alerts. The model picks the box that corresponds to the highest score that is above a configurable threshold. Preferably the system can handle multiple objects of the same class and objects of different classes in the current image in the same way.

In one embodiment an individual model detects only one object in each frame. The model draws a bounding box on the detected object along with the label and also send metadata to the session server 46.

Multi-Class, Multi-Object, Multi-Tracking

The inferencing system can support multiple classes by annotating data with multiple labels. In the colonoscopy example, these can correspond to different polyps as identified by the Paris classification scheme. TF Records for the data are created with a label map file with entries for the different labels. The model is trained on this dataset with the same label map file for multiple classes. The same label map file must be used in the inference engine when using the graph trained for these multiple classes. The algorithm is implemented in the model and run independently from other model in the case of multi-model execution, however, the ensembling of the outputs from the different models is done by the post-inference code.

In the case of multi-model execution, each model outputs the result of inference to the post-inference engine 68. In the post-inference, a kind of ensembling is performed across multiple outputs:
    If all the models in the multi-model execution are using the same graph and labels, then the post-inference performs a simple ensembling across the outputs based on the confidence scores and outputs only one or more bounding boxes, labels and scores.
    In the case of models with different accuracies, the ensembling is performed by weighting the scores with the strength of the model. The more accurate model has a higher strength, In this scenario, the session server 46 also needs to keep track of multiple instances of the object. Each instance of the object needs to satisfy the persistence threshold and the distance between the Alerts independently for generating a new Alert for the UI.

It is also possible that a single model is trained to detect multiple classes of objects, and a particular implementation will use a single model for inferencing.

Object Tracking in the Model

Object tracking is done in parallel with object detection in the inference engine.

Single Object Tracking

When an object/polyp is detected, the inference engine determines if this object is already being tracked by the object tracker, if not, it creates a new object tracker using the configured "tracker_type" and initializes the tracker with the current image and bounding box coordinates of this object. During the frames when the object is not detected using the model, the object tracker tracks the object using the tracking algorithm specified by the "tracker_type". This is done for a certain number of frames that is configured or until the tracking algorithm fails.

Multiple Object Tracking

When multiple objects are detected, the inference engine determines which of the objects detected are already being tracked by the trackers, if not, it creates a new object tracker using the "tracker_type" that is configured for each detected object that is not currently tracked. Each tracker is initialized with the current image and the box coordinates of each of the polyps that were detected in this current image. During the subsequent frames, when the object detection fails, the trackers attempt to track each of these boxes using the algorithm that corresponds to the configured "tracker_type" for the next few number frames that is configured or until the tracking algorithm fails.

Single Class Versus Multiple Class

In one embodiment the Object Tracker tracks one or more instances of the same object in consecutive frames. Alternatively it may track one or more instances of objects that each belong to different classes.

Each inference model performs the following detection and tracking and send the output to the post-inference block 68 to do the ensembling of the outputs from multiple models. The output from the model to post-inference block includes the following:

Object ID
List of box co-ordinates
List of detected labels
List of confidence scores Object ID Assignment Using the Triplet Loss Model In some cases there could be many Alerts displayed to the UI during an object detection. This can be distracting to the user and also gives the impression that there are many distinct objects being detected. It may be desired to reduce the number of Alerts shown on the UI by identifying whether the object being detected is the same one as a previously detected object or a new one. The bounding box is always shown on the UI irrespective of the fact whether the detection is part of an Alert or not.

A deep neural network (DNN) model may be used that implements a Triplet Loss function, wherein an instance of the object is compared with a set of identical but slightly different variations of the same object and also compared with a completely different object. The triplet loss function minimizes the distance of the object with similar objects and maximizes the distance of the object with the different objects.

This model is trained with on object database where each object has a set of similar instances and different instances. This model is then used along with the object detection model to detect if the current object is similar to previously detected object or not. During Object Detection inference, the output of the detection is cropped to the bounding box and this image is input to the Triplet Loss model. The Triplet Loss model provides an "embedding", which is an N element vector that can be used to compare with embeddings from earlier objects that were detected by the OD model. A simple Euclidean distance measure is used to compare similarity.

Figure 4:
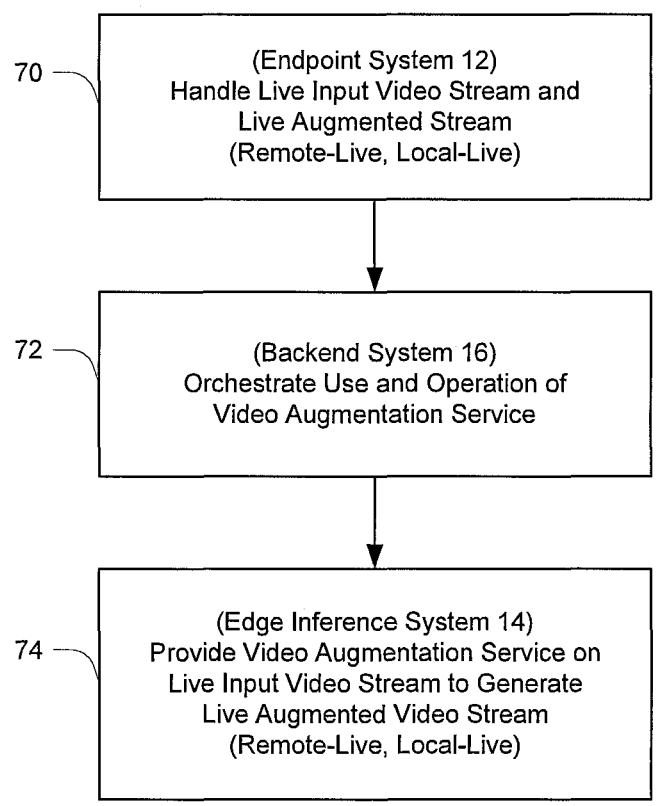
FIG. 4 is a simplified flow diagram of a process of real-time computer-aided augmentation of live input video stream.

FIG. 4 is a simplified flow diagram of high-level operation of the system 10 in providing a computer-aided video augmentation service, in particular the live session operation as described above. At 70, a system component (e.g., endpoint system 12) handles a live input video stream and live augmented stream that has been generated by the system from live input video stream. Referring to FIG. 2, the live input video stream is provided by input device 42. The augmented video stream may be provided from the edge node (see step 21, FIG. 2) in the remote-live operating mode, or from the local session server 28 (see step 22) in the local-live operating mode. The live augmented video stream is displayed to a user on display 22.

At 72, the backend system 16 performs various services to orchestrate the use and operation of the video augmentation service, examples of which are given above (e.g., authentication, IAM, tokens, security, user, operator, patient, device data, schedules, procedure data, metadata, statistics, dashboards, DB, storage, HIPAA compliant workflows/services, ML workflows, like training pipeline, dataset pipeline).

At 74, The edge inference system 14 co-operates with the endpoint 12 to provide the video augmentation service on the live input video stream. As described above, the models 54 perform inferencing on the live input video stream to identify objects of interest and generate corresponding metadata, such as bounding boxes, and the metadata is provided to the edge session server 46. In the remote-live operating mode, the edge session server 46 uses the metadata to add features to the frames of the live input video stream, thereby generating the live augmented video stream, which is then sent to the browser/app 24 of the endpoint system 12 as described above. In the local-live operating mode, the metadata is sent to the local session server 28, where it is used to add features and generate the live augmented video stream within the endpoint system 12, as also described above.

Figure 5:
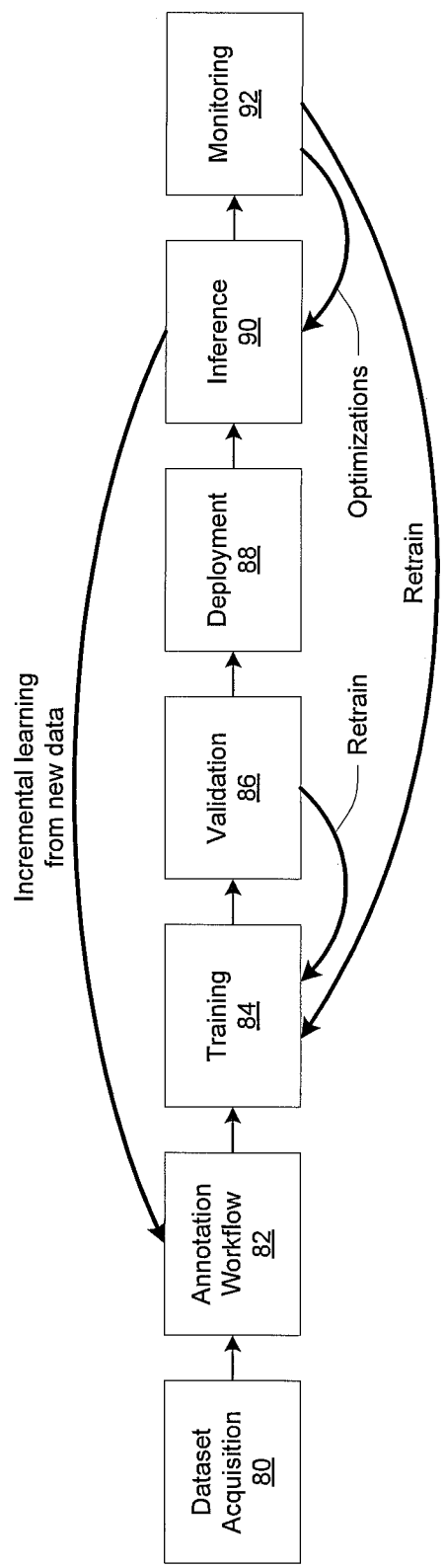
FIG. 5 is a block diagram of a training pipeline.

FIG. 5 illustrates a training pipeline for the models 54, i.e., a succession of functions/operations performed in order for initial training as well as retraining. The stages are as follows, with each being described in turn below:

Dataset Acquisition 80
Annotation Workflow 82
Training 84
Validation 86
Deployment 88
Inference 90
Monitoring 92

One significant feature mentioned below is function referred to as "auto-ML", in which a set of previously trained models are used to label new images being provided into the system for new training (retraining).

1. Dataset Acquisition 80

Dataset Pre-Processing

A set of utilities is used to categorize images based on quality metrics. The quality metrics for images are created to optimize model training performance. Utilities may be in the form of scripts and visual frontends. The set of images that meet quality standards are archived separately to enable use by the training framework.

Images used for Object Detection model training preferably satisfy the following requirements. A class or label is the name of the type of object being identified by system operation (i.e., inferencing). In general, higher the quality of images, better will be the training results. For example, Convolutional Neural Networks work better with a large number of images for training, and a rule of thumb is about 10000 images per class.

- Image resolution is 640×480 or higher in 3 channel RGB format (either JPG or PNG)
- Video feed during real time operation is at 25 FPS
- Chroma subsampling value of 4:4:4 or 4:2:2 so that images have a balance of color and luminance information
- Equal number of images per class are available to prevent class imbalance during training
- Multiple images of the same class to be labelled. A rule of thumb is about 10000 images of each label/class are available
- Object to be labelled is clearly visible with multiple images of the same object in different views/angles (6-8) are available
- Multiple images with Object(s) to be labelled of different object sizes are available
  - Objects cannot be too big (cannot be greater than 50% of the entire image resolution)
  - Objects cannot be too small (cannot be less than 10% of the entire image resolution)
- Multiple images with Object(s) to be labelled with different backgrounds are available. For example, if the procedure involves using a device that is visible along with the object in the image, many different instances of these images are required for the neural network to learn that the device is part of the background 2. Annotation Workflow 82

The dataset for labeling are then deployed to an annotation toolkit. In a startup phase, it may be necessary that human experts are used to review and label all images used for initial training. However, once a trained model (or set of models) is available, then preferably an AI-assisted labeling approach is used to reduce labeling time. A new dataset is labeled by running it through an inference engine using a previously trained model. This is the "auto-ML" functionality mentioned above. The labeled images are then deployed to the backend. A user can verify if the label assigned by the model is correct or not.

The dataset labeling is performed in batches and each labeling job in a batch is assigned to qualified professionals (e.g., medical professionals) for labeling. Each job may be assigned to more than one person, in which case consensus is required for the labels.

Once the label jobs have been completed, the output of the labeling jobs are processed to identify images and their associated labels that can be used for training the model. Labels that are in conflict or had other errors are identified, and after further discussions and review with the experts, additional label jobs may be deployed for these images.

The labeled dataset may then be further augmented by performing geometric and image quality transformations using scripts. The transformations can be experimentally determined to produce better training and inference results.

3. Training 84

Initially, the augmented dataset may be converted to a different format as needed for further processing, e.g., to TFRecords format needed by the Tensorflow framework. A TFRecord is created per label/model we train. A training docker image may be used for training the Object detection model on a training platform, such as SageMaker.

An automation script may be used to launch training jobs to the training platform. The script sets up a template for buckets for training as well as creates a custom pipeline configuration needed for the Object Detection model based on configurations provided in the script. The TFRecords are then pushed to the training folder, and the training is then launched to the training platform.

The progress of the training is monitored on a platform interface as well as on a server configured for logging training steps and associated metrics. Training logs may be captured and viewed.

4. Validation 86

Once the training completes, a checkpoint having lowest loss is selected and a frozen graph is created. Metrics provided by Tensorflow during the training are compared to previous graphs to evaluate the performance of the model. In addition, the model is then run through a battery of inference tests on test videos. The output of the inference tests are analyzed with respect to ground truths to provide metrics like Precision, Recall, Specificity and F1-Score. Scripts also analyze the models by ensembling the outputs of multiple models that were trained for each model. The inference test also provides information on model inference time. The frozen graphs are then archived.

The models can be tested end to end on the platform. In one example, a set of models is exercised using a simulated feed node and running the UI/browser 24 to view the inference output. The inference engine needs several dockers for creating the video pipeline from the Feed Node to the Client Browser, to run multiple models on GPUs and to run the Session Server that communicates between the model outputs and the UI/Browser. The end-to-end session may be initiated using a Job Scheduler that orchestrates the dockers.

A backend database is configured to specify the multiple models to be used by the inference and other configuration parameters. Configuration parameters are also set up on the Edge Node where the Inference engine and Session Server will be running. Video feed is provided as a video file that is streamed from the Feed Node VM.

5. Deployment 88 and Inference 90

These represent actual use of the trained models 54 in a live session, as described above.

6. Monitoring 92

Data generated by sessions is analyzed by a suite of scripts. These scripts create a comprehensive summary of each session that show detection plots and confidence scores per frame. A per frame analysis of the video is also generated that show the history of detections and scores generated by each of the models. This enables analysis for False Positives, missed detections (False Negatives), etc. Scripts are also used to retrieve specific alerts, retrieve segments of the video based on time, alert number and other parameters. Scripts are used to separate detected frames for further analysis.

While various embodiments of the invention have been particularly shown and described, it will be understood by those skilled in the art that various changes in form and details may be made therein without departing from the scope of the invention as defined by the appended claims.

What is claimed is:

1. A networked system for real-time computer-aided augmentation of a live input video stream, comprising:
    an endpoint system being a first networked subsystem configured and operative to handle the live input video stream and a live augmented video stream and to provide service access to a video augmentation service for the computer-aided augmentation of the live input video stream;
    a backend system being a second networked subsystem providing service orchestration to orchestrate use and operation of the video augmentation service; and
    an edge inference system being a third networked subsystem coupled to the endpoint system by an edge network and to the backend system via a backend network, the edge inference system being configured and co-operative with the endpoint system to provide the video augmentation service on the live input video stream and thereby generate the live augmented video stream, based on the service orchestration by the backend system,
    wherein the video augmentation service is a medical imaging service for automated detection of medically relevant objects in the live input video stream and overlaying object identification features identifying the relevant objects in the live augmented video stream,
    and wherein the networked system is operative to provide the video augmentation service in both a remote-live mode and in a local-live mode, the remote-live mode including (a) the edge inference system generating the live augmented video stream and providing it to the endpoint system via the edge network, and (b) the endpoint system receiving the live augmented video stream from the edge inference system via the edge network and making local use of the live augmented video stream within the endpoint system, the local-live mode including (c) the edge inference system generating augmentation metadata and providing it to the endpoint system, and (d) the endpoint system receiving the augmentation metadata from the edge inference system and adding the corresponding features to the live input video stream to generate the live augmented video stream.

2. The networked system of claim 1, wherein the endpoint system and edge inference system are further configured and co-operative over the edge network to provide a live review operating mode including playback control by which a user navigates the live augmented video stream for review purposes.

3. The networked system of claim 2, wherein the live review mode further includes additional controls by which a user adds, reviews and revises annotations in the live augmented video stream.

4. The networked system of claim 1, wherein the service access is via a client node of the endpoint system, and wherein the endpoint system and edge inference system are further configured and co-operative over the edge network to provide a live join function by which a user joins an ongoing live session from a node other than the client node.

5. The networked system of claim 1, wherein the endpoint system and edge inference system are further configured and co-operative over the edge network to (1) record the live augmented video stream to create a recorded session, and (2) provide an offline review mode by which a user later reviews the recorded session.

6. The networked system of claim 1, wherein the edge inference system is operative to perform inferencing on the live input video stream to detect an object and to generate corresponding metadata describing features to be added to the live input video stream to identify the detected object in the live augmented video stream, and the edge inference system is further configured and operative in the remote-live mode to use the metadata to generate the live augmented video stream including the features.

7. The networked system of claim 6, wherein the features include a bounding graphic overlaid at the location of the object and substantially bounding the object in the augmented live video stream.

8. The networked system of claim 1, wherein the edge inference system employs machine learning model-based inferencing the generate augmentation metadata describing features to be added to the live input video stream to generate the live augmented video stream.

9. The networked system of claim 8, wherein the machine learning model-based inferencing employs multiple models along with corresponding pre-inferencing and post-inferencing, the models being trained on corresponding distinct training sets, the post-inferencing being operative to ensemble respective results of the models and thereby reduce an effect of over-training of any individual model.

10. The networked system of claim 9, wherein the models are trained with datasets being labeled for object detection, and a training pipeline is used to train the models for different classes or objects encountered in the live input video stream during operation.

11. The networked system of claim 10, wherein for a given use there are multiple objects of interest and multiple classes for a given object, and respective models are used for the corresponding classes.

12. The networked system of claim 11, wherein training produces frozen graphs used during subsequent model-based object detection inference.

13. The networked system of claim 8, wherein the edge inference system is further configured and operative to receive user voice commands as part of a voice user interface, and to employ natural language processing to identify the user voice commands and take corresponding automated action in providing the live augmented video stream.

14. The networked system of claim 1, wherein the endpoint system, edge inference system and backend system are configured and co-operative over the edge and backend networks to collect procedure data and metadata including metadata describing objects detected in the live input video stream, and to use the procedure data and metadata to generate corresponding documentation for later offline use.

15. The networked system of claim 1, wherein the endpoint system includes:
an input device configured and operative to generate the live input video stream; and
a display configured and operative to display the live augmented video stream.

16. The networked system of claim 1, wherein the edge network has lower latency than the backend network.

17. The networked system of claim 1, wherein the edge inference system is configured to provide the video augmentation service using a collection of microservices distributed among different computing nodes of the edge inference system, the computing nodes including respective containers or virtual machines hosting the respective microservices.

18. The networked system of claim 1, wherein the endpoint system includes a streaming server computer and the edge inference system includes a streaming client computer, the streaming server computer and streaming client computer being coupled together via the edge network and being co-operative to convey the live video stream from the endpoint system to the edge inference system via the edge network using a streaming protocol.

19. The networked system of claim 1, wherein:
the endpoint system is a first endpoint system, and the video streams and video augmentation service are first video streams and a first video augmentation service respectively;
the networked system further includes a second endpoint system being a fourth networked subsystem configured and operative to handle a second live input video stream and a second live augmented video stream and to provide service access to a second video augmentation service for computer-aided augmentation of the second live input video stream;
the backend system further provides service orchestration to orchestrate use and operation of the second video augmentation service; and
the edge inference system is coupled to the second endpoint system by the edge network and is configured and co-operative with the second endpoint system to provide the second video augmentation service on the second live input video stream and thereby generate the second live augmented video stream, based on the service orchestration by the backend system.

20. The networked system of claim 1, wherein the endpoint system executes a user interface (UI) application and the edge inference system includes a session server computer, the UI application and session server computer being coupled together via the edge network and being co-operative in the remote-live mode to convey the live augmented video stream from the edge inference system to the endpoint system via the edge network using a streaming protocol, the UI application being further operative to display the live augmented video stream on a display device of the endpoint system.

* * * * *